US011582606B2

(12) United States Patent
Li

(10) Patent No.: US 11,582,606 B2
(45) Date of Patent: Feb. 14, 2023

(54) TERMINAL VERIFICATION METHOD, AND AP DEVICE, TERMINAL AND SYSTEM

(71) Applicant: XI'AN YEP TELECOMMUNICATION TECHNOLOGY, LTD., Xi'an (CN)

(72) Inventor: Wei Li, Xi'an (CN)

(73) Assignee: XI'AN YEP TELECOMMUNICATION TECHNOLOGY, LTD., Xi'an (CN)

( * ) Notice: Subject to any disclaimer, the term of this patent is extended or adjusted under 35 U.S.C. 154(b) by 191 days.

(21) Appl. No.: 17/043,367

(22) PCT Filed: Dec. 12, 2018

(86) PCT No.: PCT/CN2018/120744
§ 371 (c)(1),
(2) Date: Sep. 29, 2020

(87) PCT Pub. No.: WO2020/029498
PCT Pub. Date: Feb. 13, 2020

(65) Prior Publication Data
US 2021/0021996 A1 Jan. 21, 2021

(30) Foreign Application Priority Data
Aug. 7, 2018 (CN) .......................... 201810889475.9

(51) Int. Cl.
*H04W 12/06* (2021.01)
*H04W 12/69* (2021.01)
(Continued)

(52) U.S. Cl.
CPC ......... *H04W 12/06* (2013.01); *H04W 12/037* (2021.01); *H04W 12/0471* (2021.01);
(Continued)

(58) Field of Classification Search
CPC .............. H04L 63/101; H04W 12/037; H04W 12/0471; H04W 12/06; H04W 12/08;
(Continued)

(56) References Cited

U.S. PATENT DOCUMENTS 8,625,796 B1 * 1/2014 Ben Ayed ............. H04W 12/64
380/258
9,455,964 B2 * 9/2016 Mower ................... H04W 4/33
(Continued)

FOREIGN PATENT DOCUMENTS

CN 102791016 11/2012
CN 105245539 A * 1/2016
(Continued)

OTHER PUBLICATIONS

English Translation of International Search Report for International application No. PCT/CN2018/120744 , dated Apr. 24, 2019.
(Continued)

*Primary Examiner* — Michael Simitoski
(74) *Attorney, Agent, or Firm* — The PL Law Group, PLLC

(57) ABSTRACT

Disclosed are a terminal verification method, an AP device, a terminal and a system, wherein the AP device is an encrypted AP device. The method comprises: receiving a connection request sent by a first terminal, wherein the connection request comprises identification information of the first terminal; querying an authorization list according to the identification information of the first terminal, wherein the authorization list includes identification information of terminals located within a preset password-free range; and returning an authorization response to the first terminal when the authorization list includes the identification information of the first terminal, wherein the authorization response is used for instructing the first terminal to establish
(Continued)

a network connection with the AP device. The AP device does not need to verify a first terminal located within a password-free range, thereby reducing the number of first terminals that require identity verification within a WLAN coverage range, reducing the resource consumption of the identity verification for the AP device, and enabling the use of a WLAN to be more convenient.

13 Claims, 8 Drawing Sheets

(51) Int. Cl.
    *H04W 12/08*     (2021.01)
    *H04W 12/64*     (2021.01)
    *H04W 12/037*     (2021.01)
    *H04W 12/0471*     (2021.01)
    *H04W 84/12*     (2009.01)

(52) U.S. Cl.
    CPC ........... *H04W 12/08* (2013.01); *H04W 12/64* (2021.01); *H04W 12/69* (2021.01); *H04W 84/12* (2013.01)

(58) Field of Classification Search
    CPC ..... H04W 12/64; H04W 12/69; H04W 4/021; H04W 8/12
    See application file for complete search history.

(56) References Cited

U.S. PATENT DOCUMENTS

| | | | | |
|---|---|---|---|---|
| 2004/0028017 | A1* | 2/2004 | Whitehill | H04W 12/06 370/349 |
| 2006/0025127 | A1* | 2/2006 | Cromer | H04W 36/30 455/432.1 |
| 2006/0179311 | A1* | 8/2006 | McCorkle | G01S 13/0209 713/168 |
| 2007/0177549 | A1* | 8/2007 | Lo | H04W 36/0058 370/331 |
| 2010/0313241 | A1* | 12/2010 | Lee | H04W 12/06 709/229 |
| 2013/0152168 | A1* | 6/2013 | Nasir | H04W 12/64 726/4 |
| 2015/0172926 | A1 | 6/2015 | Buchmayer et al. | |
| 2015/0215762 | A1* | 7/2015 | Edge | H04W 8/005 370/338 |
| 2016/0227591 | A1* | 8/2016 | Oh | H04W 12/06 |
| 2017/0063823 | A1* | 3/2017 | Cheng | H04W 12/08 |
| 2017/0289392 | A1* | 10/2017 | Hwang | G06F 3/1267 |
| 2017/0332430 | A1* | 11/2017 | Ponnuswamy | H04W 76/18 |
| 2018/0176309 | A1* | 6/2018 | Gloanec | H04L 67/125 |
| 2018/0191689 | A1* | 7/2018 | Jeyachandrasekar | H04L 63/10 |
| 2018/0242233 | A1* | 8/2018 | Hu | H04L 63/0428 |
| 2019/0053124 | A1* | 2/2019 | Bitra | H04W 76/10 |
| 2019/0319951 | A1* | 10/2019 | West, III | H04L 63/0861 |
| 2021/0219212 | A1* | 7/2021 | Morioka | H04W 48/16 |

FOREIGN PATENT DOCUMENTS

| | | | | |
|---|---|---|---|---|
| CN | 105406961 | | 3/2016 | |
| CN | 107146294 | | 9/2017 | |
| CN | 111132137 | A * | 5/2020 | |
| EP | 2928245 | A1 * | 10/2015 | ........... H04B 17/318 |
| JP | 2013198130 | A * | 9/2013 | |
| WO | WO-2016203131 | A1 * | 12/2016 | ............ G06F 21/35 |

OTHER PUBLICATIONS

English Translation of Written Opinion for International application No. PCT/CN2018/120744 , dated Apr. 24, 2019.
International Search Report for International application No. PCT/CN2018/120744 , dated Apr. 24, 2019.
Written Opinion for International application No. PCT/CN2018/120744, dated Apr. 24, 2019.
International Preliminary Report on Patentability International application No. PCT/CN2018/120744 , dated Feb. 9, 2021.
International Preliminary Report on Patentability, English Translation, International application No. PCT/CN2018/120744 , dated Feb. 9, 2021.

\* cited by examiner

TERMINAL VERIFICATION METHOD, AND AP DEVICE, TERMINAL AND SYSTEM

CROSS-REFERENCE TO RELATED APPLICATIONS

This application is a national phase filing under 35 U.S.C. § 371 of PCT International Application PCT/CN2018/120744, filed Dec. 12, 2018, and published under PCT Article 21(2) in Chinese as WO/2020/029498 on Feb. 13, 2020. PCT/CN2018/120744 claimed priority benefit of China Patent Application No. 201810889475.9 filed Aug. 7, 2018. The above identified applications are hereby incorporated by reference in their entirety.

TECHNICAL FIELD

The present application relates to the technical field of wireless communication, and in particular to a terminal verification method, an AP device, a terminal and a system.

BACKGROUND

With the development of communication technologies, the use of Wireless Local Area Networks (WLANs) is becoming more and more popular. The implementation of the WLAN requires participation of an Access Point (AP) device, and the AP device is connected to a wired network, so that a terminal in a wireless signal coverage range of the AP device can access the wired network through the AP device, thereby enabling the terminal to implement wireless Internet access.

However, in order to improve security of the WLAN, the terminal generally needs to access the wired network through the AP device after identity verification by the AP device. When there are many terminals in the wireless signal coverage range of the AP device, the identity verification of the terminals will consume too many operation resources of the AP device, which affects the quality of the WLAN network. Meanwhile, when the terminal is being identity-verified, the terminal user is often required to input a verification key in the terminal, so that the use of the WLAN is excessively cumbersome.

Therefore, the terminal verification method in the existing WLAN is too cumbersome, and its convenience needs to be further improved.

SUMMARY

The present application provides a terminal verification method, an AP device, a terminal and a system, for improving convenience of terminal verification in a WLAN.

In a first aspect, an embodiment of the present application provides a terminal verification method, applied to an Access Point (AP) device in a Wireless Local Area Network (WLAN), wherein the AP device is an encrypted AP device, the method comprising:

receiving a connection request sent by a first terminal; wherein the connection request comprises identification information of the first terminal; querying an authorization list according to the identification information of the first terminal; wherein the authorization list includes identification information of terminals located within a preset password-free range; and returning an authorization response to the first terminal when the authorization list includes the identification information of the first terminal; wherein the authorization response is used for instructing the first terminal to establish a network connection with the AP device.

By adopting the above solution, when the AP device determines that the first terminal is located within the preset password-free range according to the authorization list, it does not need to verify the first terminal located within the password-free range and the authorization response is directly returned to the first terminal, thereby reducing the number of first terminals that require identity verification within the WLAN coverage range, reducing the resource consumption of the identity verification for the AP device, and enabling the use of the WLAN to be more convenient.

Alternatively, the method further comprises:

periodically transmitting a broadcast signal; wherein the broadcast signal is used for instructing the first terminal to determine positioning characteristics of the received broadcast signal and return a positioning response to the AP device; the positioning response includes the identification information of the first terminal and the positioning characteristics; the first terminal is any terminal which receives the broadcast signal; and receiving the positioning response, and adding the identification information of the first terminal into the authorization list when it is determined according to the positioning characteristics in the positioning response that the first terminal is located within the password-free range and the identification formation of the first terminal does not exist in the authorization list.

Alternatively, after adding the identification information of the first terminal into the authorization list, the method further comprises:

sending an authentication response to the first terminal.

Sending an authentication response to the first terminal located within the password-free range can enable the first terminal to determine that it itself has an authority to connect the AP device.

Alternatively, when the authorization list does not include the identification information of the first terminal, confirming that the first terminal fails to be verified;

or, sending a verification instruction to the first terminal; wherein the verification instruction is used for instructing the first terminal to return a verification key; and verifying the first terminal according to the verification key returned by the first terminal;

When the first terminal is located outside the password-free range, the first terminal is confirmed directly to be failed in the verification, so as to improve the security of the AP device. And, when the first terminal is located outside the password-free range, the first terminal is verified through the verification key, so that a legal terminal located outside the password-free range can also use the WLAN.

Alternatively, the method further comprises:

receiving an Internet access signal sent by the first terminal; wherein the Internet access signal is sent to the AP device by the first terminal after it establishes a connection with the AP device; wherein the Internet access signal comprises the identification information of the first terminal; and after determining that the authorization list includes the identification information of the first terminal, returning a reception response to the first terminal.

Alternatively, the positioning characteristics include a reception strength and a reception angle of the signal.

Alternatively, the password-free range is represented by a boundary function; wherein the boundary function is used for characterizing a relationship between the reception strength and the reception angle of the broadcast signal at a boundary of the password-free range;

the method further comprises:

transmitting the broadcast signal;

receiving positioning responses returned by a plurality of sampling devices according to the broadcast signal;

determining a positioning response with the reception strength meeting a preset strength among the positioning responses returned by the plurality of sampling devices; and determining the boundary function of the password-free range according to the reception strength and the reception angle in the positioning response with the reception strength meeting the preset strength.

Alternatively, the password-free range is represented by a boundary function; the boundary function is used for characterizing a relationship between the reception strength and the reception angle of the broadcast signal at a boundary of the password-free range;

the method further comprises:

transmitting the broadcast signal;

receiving positioning responses returned by a plurality of sampling devices according to the broadcast signal; wherein the plurality of sampling devices are located at a preset boundary of the password-free range; and determining the boundary function of the password-free range according to the reception strengths and the reception angles in the positioning responses returned by the plurality of sampling devices.

Alternatively, the AP device determines whether the terminal is located within the password-free range according to a functional relationship between the positioning characteristics in the positioning response returned by the first terminal and the boundary function.

In a second aspect, an embodiment of the present application provides a terminal verification method applied to a terminal in a Wireless Local Area Network (WLAN), wherein the WLAN further includes an encrypted AP device, the method comprising:

sending a connection request to a target AP device; wherein the connection request includes identification information of the terminal;

receiving an authorization response returned by the target AP device; wherein the authorization response is returned to the terminal when the target AP device determines that an authorization list includes the identification information of the terminal; the authorization list includes identification information of terminals located within a preset password-free range of the AP device; and establishing a network connection with the target AP device according to the authorization response.

Alternatively, the method further comprises:

when receiving broadcast information transmitted by any AP device, determining positioning characteristics of the broadcast information; and returning a positioning response to the AP device; wherein the positioning response includes the positioning characteristics and the identification information of the terminal.

Alternatively, the method further comprises:

when authentication responses sent by a plurality of AP devices are received at the same time, determining an AP device with the strongest signal strength among a plurality of authentication responses as the target AP device; wherein the authentication response is sent to the terminal after the AP device determines that the terminal is located within the preset password-free range according to the positioning response; and sending the connection request to the target AP device.

Alternatively, after establishing a network connection with the target AP device according to the authorization response, the method further comprises:

sending an Internet access signal to the target AP device; wherein the Internet access signal comprises identification information of the terminal; and re-determining a target AP device when a reception response returned by the target AP device is not received after a preset waiting period.

In a third aspect, an embodiment of the present application provides an AP device, which is an encrypted AP device, comprising a transceiving module and a processing module;

the transceiving module is configured to receive a connection request sent by a first terminal; wherein the connection request comprises identification information of the first terminal; and the processing module is configured to query an authorization list according to the identification information of the first terminal; wherein the authorization list includes identification information of terminals located within a preset password-free range; and return an authorization response to the first terminal when the authorization list includes the identification information of the first terminal; wherein the authorization response is used for instructing the first terminal to establish a network connection with the AP device.

Alternatively, the transceiving module is further configured to:

periodically transmitting a broadcast signal; wherein the broadcast signal is used for instructing the first terminal to determine positioning characteristics of the received broadcast signal and return a positioning response to the AP device; the positioning response includes the identification information of the first terminal and the positioning characteristics; the first terminal is any terminal which receives the broadcast signal; and the processing module is further configured to receive the positioning response through the transceiving module, and add the identification information of the first terminal into the authorization list when it is determined according to the positioning characteristics in the positioning response that the first terminal is located within the password-free range and the identification information of the first terminal does not exist in the authorization list.

Alternatively, the processing module is further configured to:

send an authentication response to the first terminal through the transceiving module.

Alternatively, the processing module is further configured to:

when the authorization list does not include the identification information of the first terminal, confirm that the first terminal fails to be verified; or, send a verification instruction to the first terminal through the transceiving module; wherein the verification instruction is used for instructing the first terminal to return a verification key; and verify the first terminal according to the verification key returned by the first terminal.

Alternatively, the transceiving module is further configured to:

receive an Internet access signal sent by the first terminal; wherein the Internet access signal is sent to the AP device by the first terminal after it establishes the network connection with the AP device; wherein the Internet access signal comprises the identification information of the first terminal; and the processing module is further configured to: after determining that the authorization list includes the identification information of the first terminal, return a reception response to the first terminal through the transceiving module.

Alternatively, the positioning characteristics of the broadcast signal include a reception strength and a reception angle of the broadcast signal.

Alternatively, the password-free range is represented by a boundary function; wherein the boundary function is used for characterizing a relationship between the reception strength and the reception angle of the broadcast signal at a boundary of the password-free range;

the transceiving module is further configured to:

transmit the broadcast signal; and receive positioning responses returned by a plurality of sampling devices according to the broadcast signal; and the processing module is further configured to:

determine a positioning response with the reception strength meeting a preset strength among the positioning responses returned by the plurality of sampling devices; and determine the boundary function of the password-free range according to the reception strength and the reception angle in the positioning response with the reception strength meeting the preset strength.

Alternatively, the password-free range is represented by a boundary function; the boundary function is used for characterizing a relationship between the reception strength and the reception angle of the broadcast signal at a boundary of the password-free range;

the transceiving module is further configured to:

transmit the broadcast signal; and receive positioning responses returned by a plurality of sampling devices according to the broadcast signal; wherein the plurality of sampling devices are located at a preset boundary of the password-free range; and the processing module is further configured to:

determine the boundary function of the password-free range according to the reception strengths and the reception angles in the positioning responses returned by the plurality of sampling devices.

Alternatively, the processing module determines whether the terminal is located within the password-free range according to a functional relationship between the positioning characteristics in the positioning response returned by the first terminal and the boundary function.

In a fourth aspect, an embodiment of the present application provides a terminal, applied to a Wireless Local Area Network (WLAN), where the WLAN further includes an encrypted AP device, the terminal comprising: a transceiving module and a processing module;

the transceiving module is configured to send a connection request to a target AP device; wherein the connection request includes identification information of the terminal; and receive an authorization response returned by the target AP device; wherein the authorization response is returned to the terminal when the target AP device determines that an authorization list includes the identification information of the terminal; the authorization list includes identification information of terminals located within a preset password-free range of the AP device; and the processing module is configured to establish a network connection with the target AP device according to the authorization response.

Alternatively, the processing module is further configured to:

when the transceiving module receives broadcast information transmitted by any AP device, determine positioning characteristics of the broadcast information;

return a positioning response to the AP device through the transceiving module; wherein the positioning response includes the positioning characteristics and the identification information of the terminal.

Alternatively, the processing module is further configured to:

when authentication responses sent by a plurality of AP devices are received by the transceiving module at the same time, determine an AP device with the strongest signal strength among a plurality of authentication responses as the target AP device; wherein the authentication response is sent to the terminal by the AP device after it determines that the terminal is located within the preset password-free range according to the positioning response; and send the connection request to the target AP device through the transceiving module.

Alternatively, the transceiving module is further configured to:

send an Internet access signal to the target AP device; wherein the Internet access signal comprises identification information of the terminal; and the processing module is further configured to:

re-determine a target AP device when a reception response returned by the target AP device is not received after a preset waiting period.

In a fifth aspect, an embodiment of the present application provides an AP device, comprising: a memory, a transceiver, and a processor;

the memory is configured to store program instructions;

the processor is configured to invoke the program instructions stored in the memory, and perform the method of any of the above first aspect according to the obtained program, through the transceiver.

In a sixth aspect, an embodiment of the present application provides a terminal, comprising: a memory, a transceiver, and a processor;

the memory is configured to store program instructions;

the processor is configured to invoke the program instructions stored in the memory, and perform the method of any of the above second aspect according to the obtained program, through the transceiver.

In a seventh aspect, an embodiment of the present application provides a system, comprising the AP device of any of the above fifth aspect, and/or the terminal of any of the above sixth aspect.

In an eighth aspect, an embodiment of the present application provides a computer program product comprising a computer program stored on a non-transient computer-readable storage medium, the computer program comprising computer executable instructions that, when executed by a computer, cause the computer to perform the terminal verification method according to the embodiments of the present application.

BRIEF DESCRIPTION OF THE DRAWINGS

In order to describe the technical solutions in the embodiments of the present application more clearly, the accompanying drawings used in the description of the embodiments are briefly introduced in the following. Obviously, the accompanying drawings described in the following are only some embodiments of the present application, and persons of ordinary skill in the art may also obtain other drawings according to these accompanying drawings without creative efforts.

DETAILED DESCRIPTION

In order to make the objectives, technical solutions, and advantages of the present application clearer, the present application is further described in detail in the following with reference to the accompanying drawings. Evidently, the embodiments in the following description are only a part rather than all of the embodiments of the present application. Based on the embodiments of the present application, all other embodiments obtained by persons of ordinary skill in the art without creative efforts shall fall within the protection scope of the present application.

Figure 1:
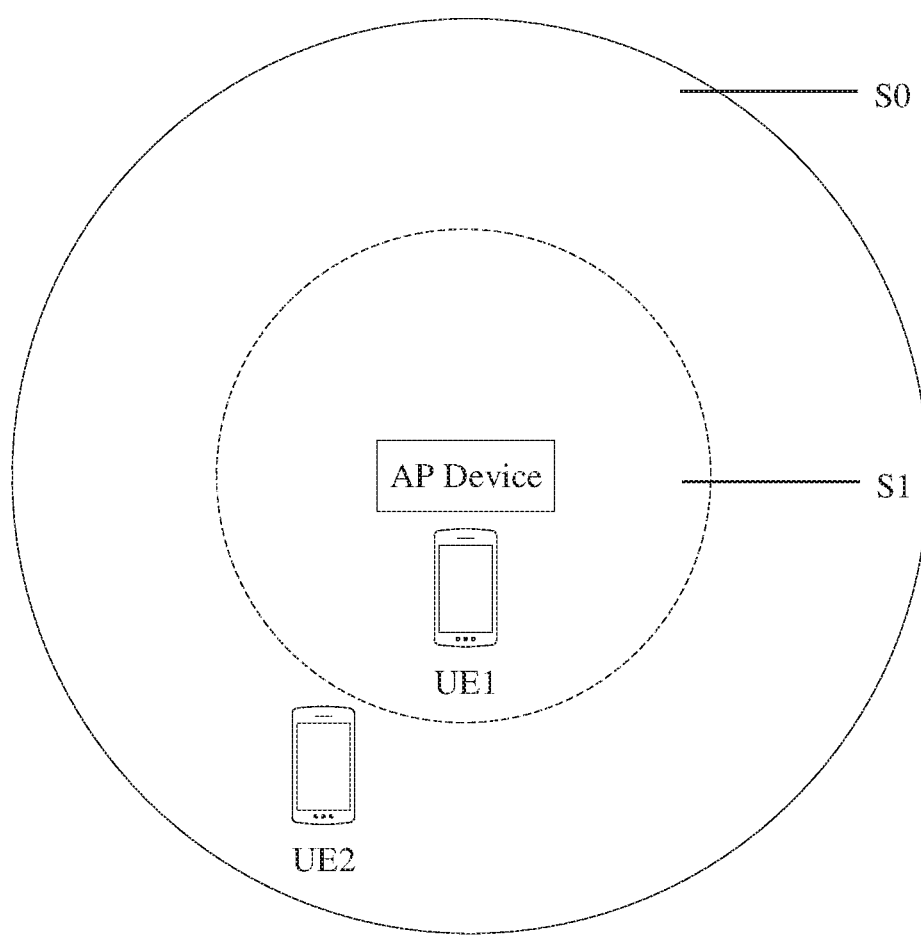
FIG. 1 is a schematic diagram of a WLAN system architecture according to an embodiment of the present application.

FIG. 1 is a schematic diagram of a WLAN system architecture according to an embodiment of the present application, and as shown in FIG. 1, the system comprises an AP device, wherein the AP device is an encrypted AP device capable of performing identity verification on a terminal requesting to access the WLAN. In the embodiment of the application, a signal coverage range (S0) of the AP device comprises a preset password-free range (S1) which is predetermined according to positioning characteristics of sampling signals of sampling devices received by the AP device.

Figure 2:
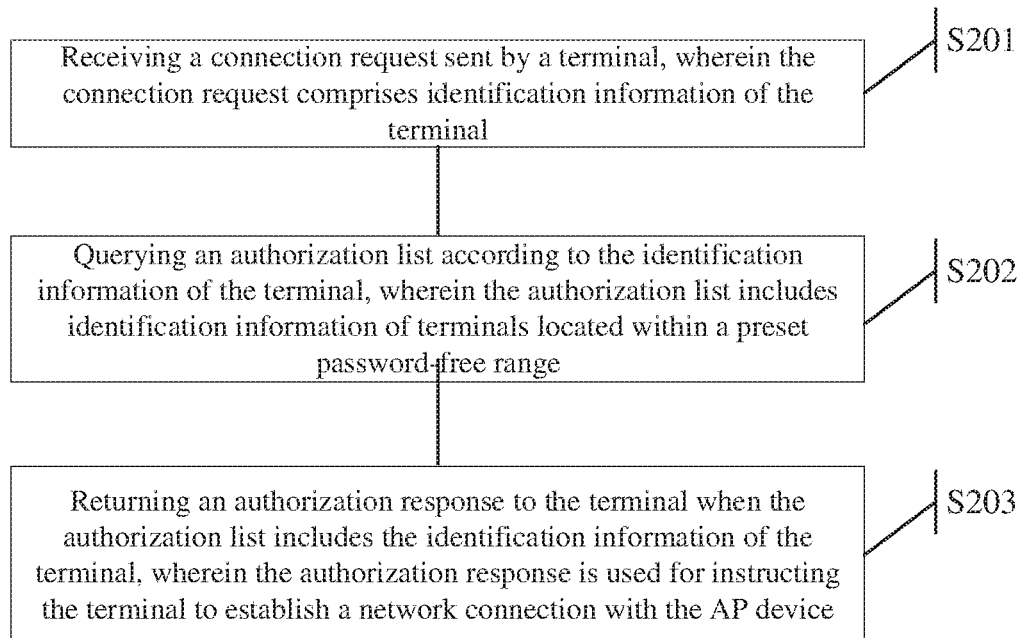
FIG. 2 is a schematic flowchart of a terminal verification method according to an embodiment of the present application.

Based on the system architecture shown in FIG. 1, an embodiment of the present application provides a terminal verification method. FIG. 2 is a schematic flowchart of a terminal verification method according to an embodiment of the present application. As shown in FIG. 2, the method mainly comprises the following steps:

S201: receiving a connection request sent by a terminal; wherein the connection request comprises identification information of the terminal.

S202: querying an authorization list according to the identification information of the terminal; wherein the authorization list includes identification information of terminal(s) located within a preset password-free range.

S203: returning an authorization response to the terminal when the authorization list includes the identification information of the terminal; wherein the authorization response is used for instructing the terminal to establish a network connection with the AP device.

The terminal is a terminal capable of requesting network services from the AP device during an operation process of the AP device, such as a mobile phone, a tablet computer, a wearable intelligent device used by a user. After receiving the connection request sent by the terminal, the AP device may query an authorization list according to identification information of the terminal, so as to determine whether the terminal is located within a preset password-free range. The identification information of the terminal may be an Internet Protocol (IP) address of the terminal, or a Medium Access Control (MAC) address of the terminal, etc. When the AP device determines that the terminal is located within the preset password-free range according to the authorization list, the AP device can directly return an authorization response to the terminal without verifying the terminal located within the password-free range, thereby reducing the number of terminals that require identity verification within a WLAN coverage range, reducing the resource consumption of the identity verification for the AP device and enabling the use of the WLAN to be more convenient.

Figure 3:
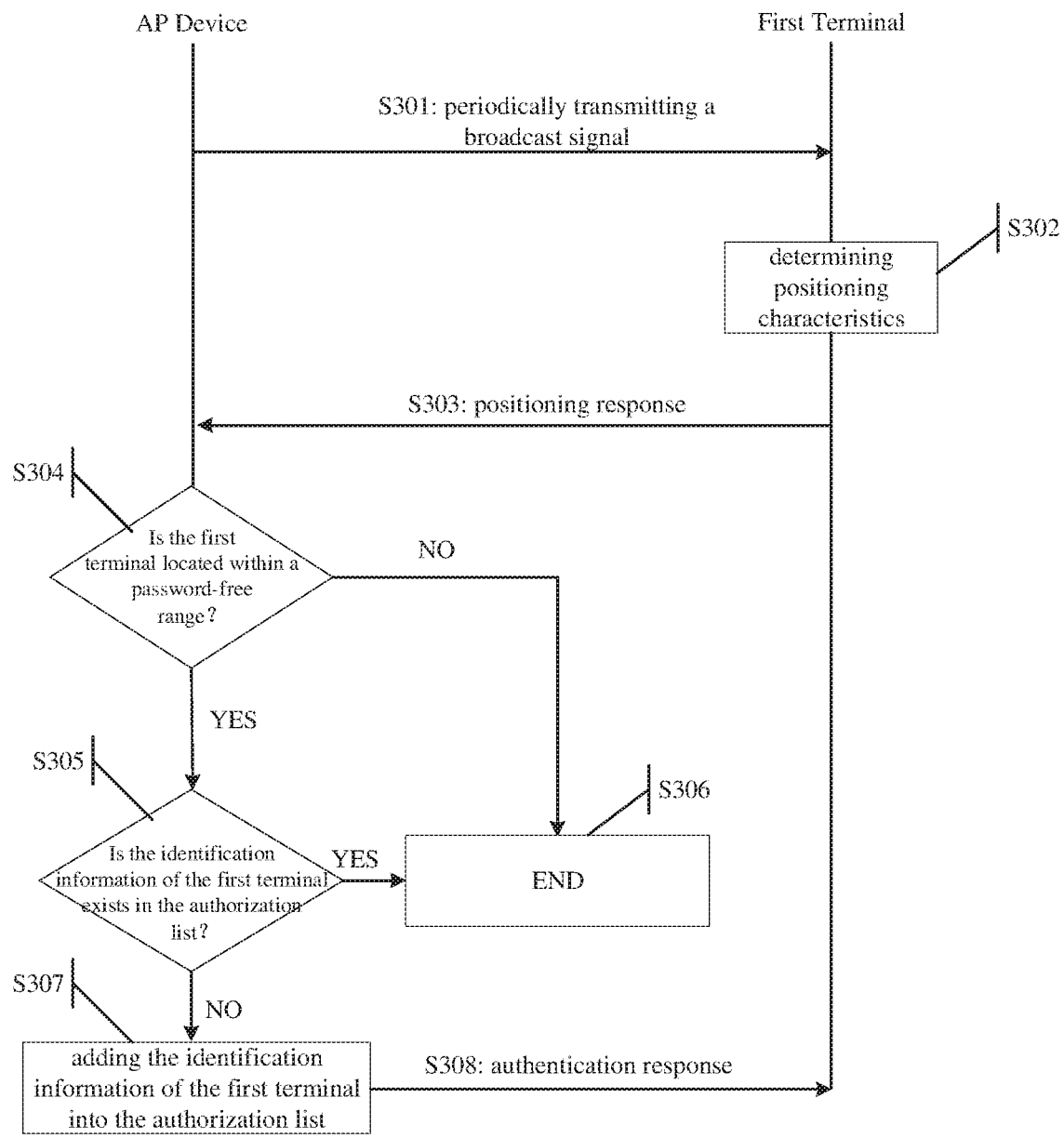
FIG. 3 is a schematic flowchart of an authorization list maintenance method according to an embodiment of the present application.

Based on the foregoing embodiment, an embodiment of the present application provides a method for maintaining an authorization list by an AP device, specifically as shown in FIG. 3, which is a schematic flowchart of an authorization list maintenance method according to the embodiment of the present application. The method mainly comprises the following steps:

S301: the AP device periodically transmits a broadcast signal.

S302: the first terminal receives the broadcast signal and determines positioning characteristics of the broadcast signal; wherein the first terminal is any terminal which receives the broadcast signal sent by the AP device.

S303: the first terminal returns a positioning response to the AP device; wherein the positioning response comprises the positioning characteristics and identification information of the first terminal.

S304: the AP device receives the positioning response and determines according to the positioning characteristics in the positioning response whether the first terminal is located within a preset password-free range; if yes, go to S305; if not, go to step S306.

S305: determining whether or not the identification information of the first terminal exists in the authorization list; if yes, go to S306; if not, go to step S307.

S306: end.

S307: adding the identification information of the first terminal into the authorization list.

In the above embodiment, the positioning characteristics of the broadcast signal are determined by a positioning method employed by the AP device. For example, the AP device may employ an Angle of Arrival (AOA) ranging scheme, where the positioning characteristic of the broadcast signal is a reception angle at which the first terminal receives the broadcast signal. For another example, the AP device may employ a Time Difference of Arrival (TDOA) positioning scheme, where the positioning characteristic of the broadcast signal is a reception time difference when the first terminal receives the broadcast signal. For a further example, the AP device may employ a Time of Arrival (TOA) positioning scheme, where the positioning characteristic of the broadcast signal is a reception time when the first terminal receives the broadcast signal. In one possible implementation, the AP device may employ a Received Signal Strength (RSSI) positioning scheme, in which case, the positioning characteristics of the broadcast signal are a reception strength and a reception angle at which the first terminal receives the broadcast signal.

The RSSI positioning scheme is derived from a fading model of signal, and a basic calculation formula is shown in Formula 1:

$$PL=-Gr-Gt+20 \text{ Log}(4*PI*R/\lambda) \quad \text{(Formula 1)}$$

where PL is a wireless signal strength attenuation in space, Gr is a gain of a receiving antenna, Gt is a gain of a transmitting antenna, R is a distance between the AP device and the terminal, and λ is a wavelength of the signal.

In S304, the AP device may determine the strength attenuation of the broadcast signal, according to a relationship between the wireless signal strength attenuation and the distance shown in Formula 1 and the reception strength of the broadcast signal in the positioning response returned by the first terminal, thereby determining the distance from the first terminal to the AP device. Meanwhile, the AP device may determine an orientation of the first terminal relative to the AP device according to the reception angle of the broadcast signal in the positioning response, and may determine a position of the first terminal relative to the AP device by using a polar coordinate positioning method. The polar coordinate positioning has no requirement on the shape of the positioning area, and can be used for positioning of any point in positioning areas with different shapes such as an oval area, a rectangular area, an irregular area and the like, so that the polar coordinate positioning is very suitable for positioning of terminals in the password-free range in the present application. For a three-dimensional space, the position of the terminal can also be obtained based on a spherical coordinate positioning, which is similar to the polar coordinate positioning and can be realized on the basis of the polar coordinate positioning method, and which is not repeated here.

When the AP device positions the terminal according to the received strength of the terminal signal, the strength of the broadcast signal may fluctuate, resulting in an error in the positioning result. In a feasible implementation, the AP device fits a plurality of reception strengths according to a gaussian distribution probability model based on the reception strengths of the broadcast signal in the positioning responses returned by a plurality of first terminals that are continuously received within a certain sampling period, determines an average value and a standard deviation of the reception strengths of the broadcast signal within the sampling period according to the fitting result, and then positions the first terminals by using the average value and the standard deviation of the reception strengths of the broadcast signal and Formula 1. Because the strength distribution of any communication signal generally obeys the Gaussian distribution probability model, for the same first terminal under the same environment, the reception strength of the broadcast signal it receives also obeys the Gaussian distribution theoretically, and a plurality of received strengths of the same broadcast signal determined by the same first terminal are fitted according to the Gaussian distribution probability model, so that the determined average value and standard deviation can better reflect a real situation of the reception strength of the broadcast signal, thereby obtaining a more accurate positioning result.

The RSSI positioning scheme is suitable for microwave signals, and as most of terminals adopt microwave communication, the RSSI positioning scheme is more suitable for positioning the terminals.

In S305, after determining that the first terminal is located within the password-free range, the AP device further determines whether the identification information of the first terminal is included in the authorization list. If the identification information of the first terminal does not exist in the authorization list, the identification information of the first terminal is added into the authorization list.

In a specific implementation, the authorization list may include only identification information of first terminal(s) located within the password-free range, so in S305, if the AP device determines that the first terminal is located outside the password-free range, S306 is directly performed to end authentication of the first terminal.

In another possible implementation, the authorization list further includes first terminals located outside the password-free range, and identification information of each first terminal. In such case, the authorization list may be as shown in the following Table 1:

TABLE 1

| Terminal identification | Location password-free | Authorization status |
|---|---|---|
| MAC a | 1 | 1 |
| MAC b | 0 | 0 |
| MAC c | 0 | 1 |
| ... | | ... |

As shown in Table 1, the authorization list includes terminal identification, location password-free, and authorization status, wherein the location password-free of 1 indicates that the terminal is located within a password-free range, and the location password-free of 0 indicates that the terminal is located outside the password-free range; the authorization status of 1 indicates that the terminal has an authority to establish a network connection with the AP device, and the authorization status of 0 indicates that the terminal does not have an authority to establish a network connection with the AP device.

Specifically, as shown in the above Table 1, Terminal a has a terminal identification of MAC a, is located within the password-free range, and therefore has the authority to establish a network connection with the AP device. Terminal b has a terminal identification of MAC b, is located outside the password-free range and does not have the authority to establish a network connection with the AP device, but is still added to the authorization list.

Alternatively, when the AP device determines according to the authorization list that a terminal is located outside the password-free range, e.g., UE2 in FIG. 1, the AP device may process the terminal in at least one of the following two ways:

Way 1: directly confirming that the terminal fails to be verified. In this way, the AP device directly refuses terminals outside the password-free range to access the WLAN, so that security of the WLAN can be improved.

Way 2: sending a verification instruction to the terminal; after receiving the verification instruction, the terminal will return a verification key to the AP device; the AP device further verifies the terminal according to the verification key returned by the terminal. As shown in Table 1, although Terminal c corresponding to MAC c is located outside the password-free range, Terminal c still has the authority to establish a network connection with the AP device.

Figure 4:
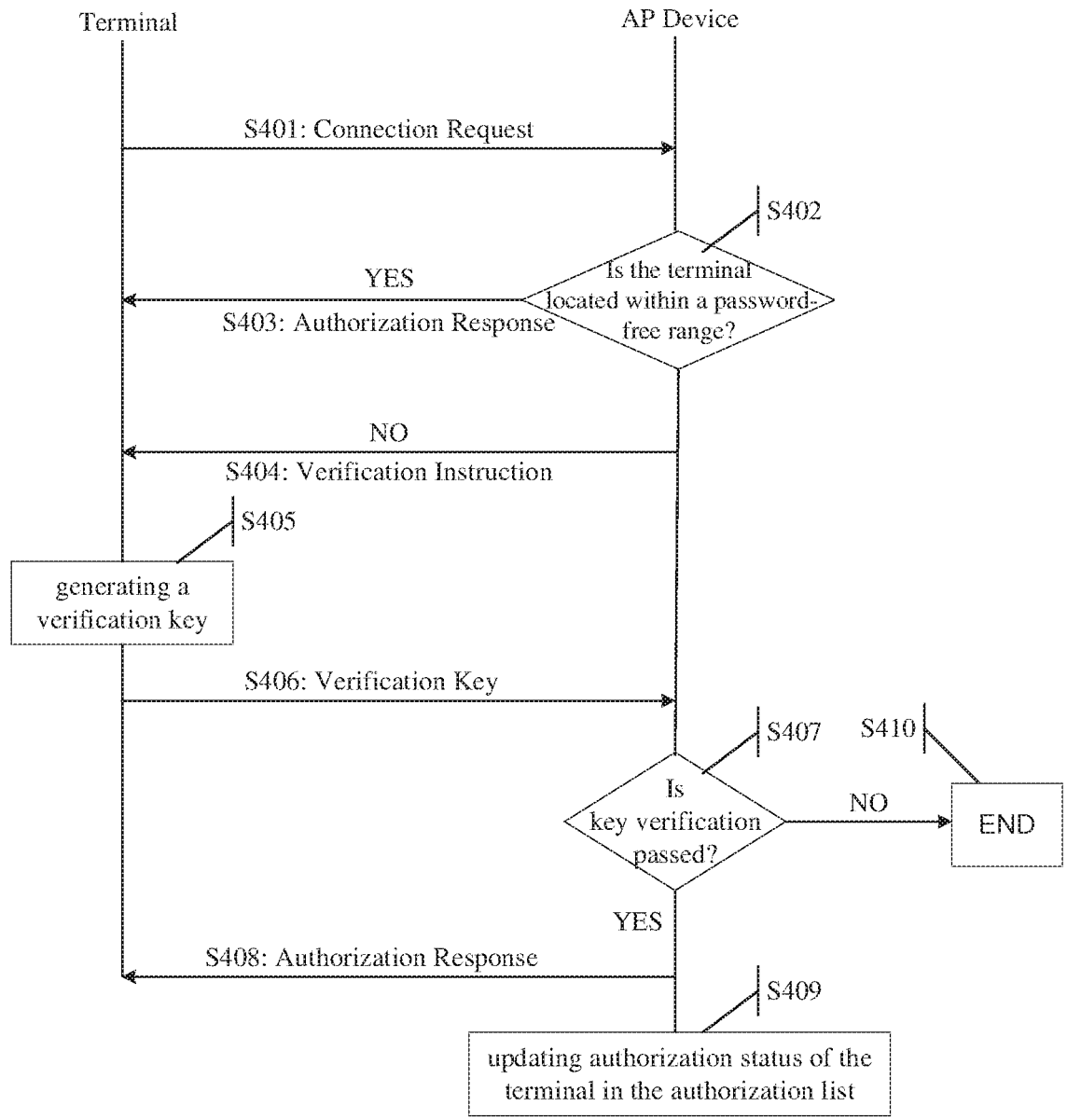
FIG. 4 is a schematic flowchart of a specific terminal verification process according to an embodiment of the present application.

Based on the way 2, an embodiment of the present application provides a specific terminal verification process for illustration. FIG. 4 is a schematic flowchart of a specific terminal verification process according to the embodiment of the present application, which as shown in FIG. 4, mainly comprises the following steps:

S401: the terminal sends a connection request to the AP device, wherein the connection request comprises identification information of the terminal.

For example, if the terminal is Terminal b, the connection request further comprises a MAC address of Terminal b, namely, MAC b.

S402: the AP device determines whether or not the terminal is located within the password-free range according to the authorization list, and if yes, go to S403; if not, go to S404.

For example, after receiving the connection request sent by Terminal b, the AP device may determine: according to the authorization list shown in Table 1 that, Terminal b is located outside the password-free range, so S404 will performed next. After receiving the connection request sent by Terminal a, the AP device may determine according to the authorization list shown in Table 1 that, Terminal a is located within the password-free range, so S403 will be performed next.

S403: returning an authorization response to the terminal.

S404: returning a verification instruction to the terminal.

S405: after receiving the verification instruction, the terminal generates a verification key.

For example, the verification key may be a pre-registered account password, or may be a dynamic password such as a mobile phone authentication code.

S406: the terminal sends the verification key to the AP device.

S407: the AP device verifies the terminal according to the verification key, and if the verification is passed, go to S408; if the verification is not passed, go to S410.

S408: returning the authorization response to the terminal.

S409: updating the authorization status of the terminal in the authorization list.

For example, an original authorization status of Terminal b in the authorization list shown in Table 1 is "0" (unauthorized), and after Terminal b passes the verification by the verification key, the authorization status of Terminal b in the authorization list is updated to "1" (authorized).

S410: end.

In the way 2, it is not needed to verify terminals located within the password-free range so as to reduce the resource consumption of the AP device and improve use experience of the WLAN, and terminals located outside the password-free range can be verified in a conventional key verification mode, so that a legal terminal located outside the password-free range can also be connected with the AP device so as to access the WLAN.

In a feasible implementation, after determining that the first terminal is located within the password-free range, the AP device may further return an authentication response to the first terminal, as shown by S308 in FIG. 3. The first terminal may determine, according to the received authentication response, a target AP device with which to establish a network connection, and send a connection request to the target AP device.

Figure 5:
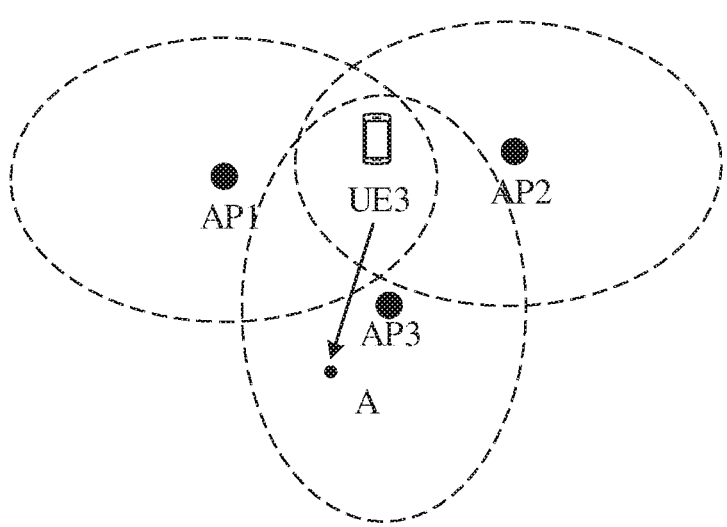
FIG. 5 is a schematic diagram of multiple AP coverage areas according to an embodiment of the present application.

In a specific implementation, a terminal may be located in password-free ranges of multiple AP devices at the same time. FIG. 5 is a schematic diagram of multiple AP coverage ranges according to the embodiment of the present application. In FIG. 5, UE3 is located within password-free ranges of AP1, AP2, and AP3 simultaneously, thus UE3 will receive broadcast signals of AP1, AP2, and AP3 simultaneously and return positioning responses to the three AP devices, respectively, and then UE3 will receive authentication responses of AP1, AP2, and AP3 simultaneously. In a feasible implementation, when the terminal receives authentication responses sent by multiple AP devices simultaneously, the terminal may further determine an AP device corresponding to the authentication response with the strongest signal strength among the multiple authentication responses as the target AP device, and send a connection request to the target AP device. For example, in FIG. 5, the signal strength of the authentication response returned by the AP1 is the strongest, then UE3 may determine the AP1 as the target AP device, and send a connection request to the AP1, thereby establishing a network connection with AP1. Alternatively, after establishing a connection with AP1, UE3 will keep the connection with the AP1, and will not switch the AP due to the decrease of the signal strength sent by the AP1, so as to improve the network stability and reduce the power consumption of the terminal system. For example, in FIG. 5, after UE3 establishes a connection with the AP1 at the position as shown in the figure, the connection with the AP1 is maintained until UE3 moves out of the password-free range of the AP1 during its movement toward a point A.

After the terminal establishes a network connection with the AP device, it can access a wired network through the AP device. After the terminal accesses the WLAN, an Internet access signal is sent to the AP device, and the AP device forwards information contained in the Internet access signal to the wired network. In a specific implementation, it is possible for a mobile terminal to move out of the password-free range of the AP device after connecting with the AP device. Therefore, the AP device will continuously position the terminal that establishes a network connection therewith, and if the terminal moves out of the password-free range, the authorization status of the terminal in the authorization list will be updated. Meanwhile, after receiving an Internet access signal sent by any terminal, the AP device may also query the authorization list according to the identification information of the terminal included in the Internet access signal, and return a reception response to the terminal when determining according to the authorization list that the terminal still has the authority, so that the terminal can determine that the AP device has received the Internet access signal sent by the terminal. When determining according to the authorization list that the terminal no longer has the authority, the AP device may stop forwarding the information included in the Internet access signal to the wired network and send a reception response to the terminal. In a feasible implementation, it is also possible to send a verification instruction to the terminal, to initiate a key verification of the terminal, and so on.

Based on the above, after the terminal sends the Internet access signal to the AP device, it may further determine whether the reception response returned by the AP device is received within a preset waiting period, and if the reception response is not received or the verification instruction returned by the AP device is received, it may be determined that the AP device is no longer providing the Internet access service for the terminal. At this time, the terminal may re-determine a target AP device and send a connection request to the target AP device according to the authentication response returned by other AP devices.

In the embodiment of the present application, the password-free range is identified by a boundary function, and the boundary function may be determined according to positioning characteristics in positioning responses returned by sampling devices, received by the AP device. The boundary function is used for characterizing a relationship between the reception strength and the reception angle of the broadcast signal at a boundary of the password-free range. In a specific implementation, the sampling devices may be one or more common brands of terminals in the current market. In order to avoid the difference in the positioning characteristics determined between the sampling devices and the terminal in an actual use, a certain error range can be set for the boundary function so as to adapt to the difference between different brands of terminals and the sampling devices.

Generally, when determining the boundary function of the password-free range, the more the number of sampling devices, the more accurate the result of the subsequent determination as to whether the terminal is located within the password-free range. The following two feasible methods for determining the password-free range are provided by the embodiments of the present application to illustrate the password-free range.

Method 1: Based on Strength

The AP device periodically transmits a broadcast signal; receives positioning responses returned by a plurality of sampling devices according to the broadcast signal; determines, according to a preset strength, a positioning response with the reception strength of the broadcast signal meeting the preset strength among the positioning responses returned by the plurality of sampling devices; and determines a boundary function of the password-free range according to the reception strength and the reception angle in the positioning response with the reception strength of the broadcast signal meeting the preset strength.

Figure 6:
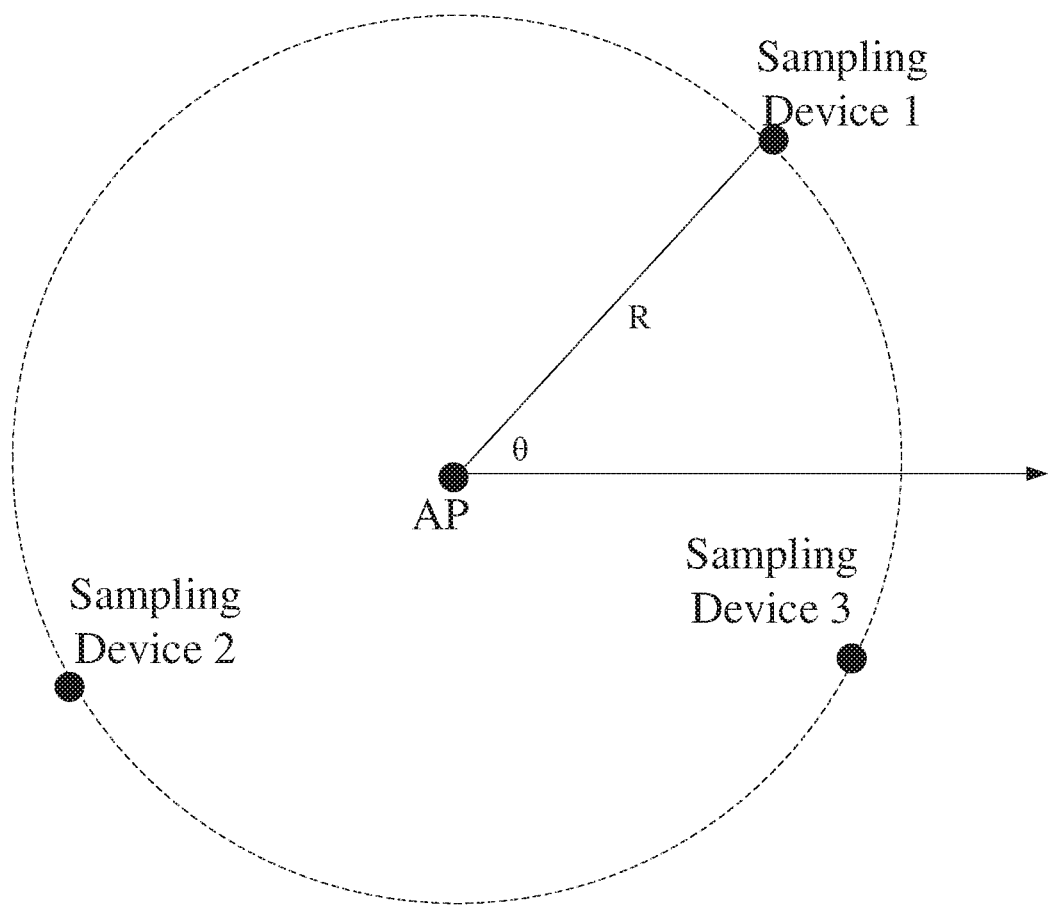
FIG. 6 is a schematic diagram of a password-free range according to an embodiment of the present application.

At the boundary of the password-free range determined by adopting the above method, the reception strength of the broadcast signal received by the sampling devices is the same. FIG. 6 is a schematic diagram of a password-free range according to an embodiment of the present application. The password-free range determined by adopting the above method is ideally a circular area, so that the password-free range can be determined by using three sampling devices, namely, sampling device 1, sampling device 2, and sampling device 3. In an actual use, because signal attenuation in each direction may be inconsistent, the determined password-free range may not be a regular circular area, but the reception strength of the broadcast signal in the positioning responses sent by the sampling devices at the boundary received by the AP device remains the same.

After determining the boundary of the password-free range, the AP device may store polar coordinates of the sampling devices at each boundary, respectively. They can be stored generally in the form of an array (STA-num, AP-num, MAC, RSSI_avg, Theta(θ), RSSI_dev, Add_info, . . . ) wherein the meaning of each element in the array can be shown in the following table.

TABLE 1

| Sta_num | Int | numbering of sampling devices |
| Ap_num | Int | numbering of AP devices |
| RSSI_avg | Float | an average value of the received strengths of the broadcast signal measured by the sampling device n times, where in general n > 5 |

TABLE 1-continued

| Theta(θ) | Float | the reception angle of the broadcast signal measured by the sampling device |
| RSSI_dev | Float | a standard deviation of the received strengths of the broadcast signal measured by the sampling device n times, where in general n > 5 |
| MAC | Char | a MAC address of the AP device |
| Add info | Char | note |
| . . . | . . . | . . . |

In a feasible implementation, the AP device may further determine the boundary function of the password-free range according to the reception strengths and the reception angles in the positioning responses returned by the sampling devices at the boundary of the password-free range. The boundary function is used for characterizing the relationship between the reception strength and the reception angle of the broadcast signal received by the sampling devices at the boundary of the password-free range, so as to determine whether the first terminal is located within the password-free range according to the positioning characteristics in the positioning response returned by the first terminal. Of course, the reception strength may also be an average value or a standard deviation determined according to the Gaussian distribution, which is not repeated in detail here.

Method 2: Based on Preset Boundary Lines

The AP device transmits a broadcast signal; then, receives positioning responses returned by a plurality of sampling devices, wherein the sampling devices are arranged at a preset boundary of the password-free range; and determines a boundary function of the password-free range according to the reception strengths and the reception angles in the positioning responses returned by the plurality of sampling devices; wherein the boundary function is used for characterizing the relationship between the reception strengths and the reception angles of the broadcast signal received by the sampling devices at the boundary of the password-free range.

Figure 7:
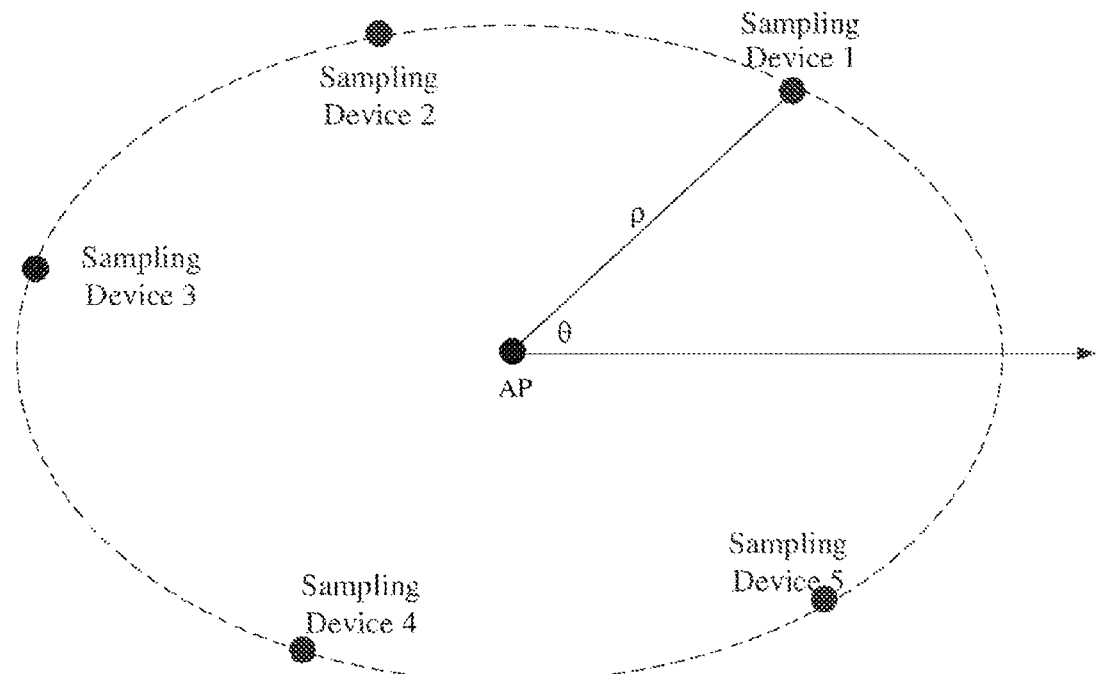
FIG. 7 is a schematic diagram of a password-free range according to an embodiment of the present application.
Figure 8:
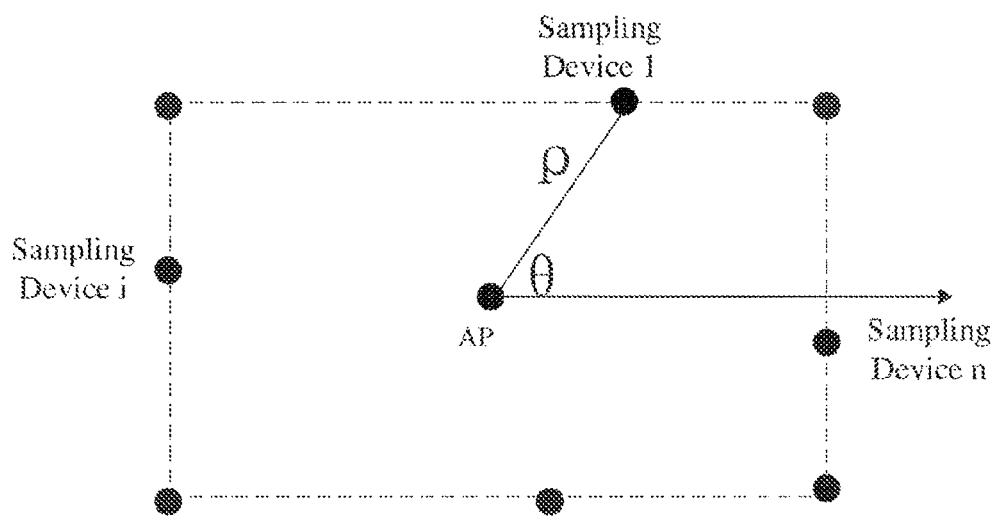
FIG. 8 is a schematic diagram of a password-free range according to an embodiment of the present application.
Figure 9:
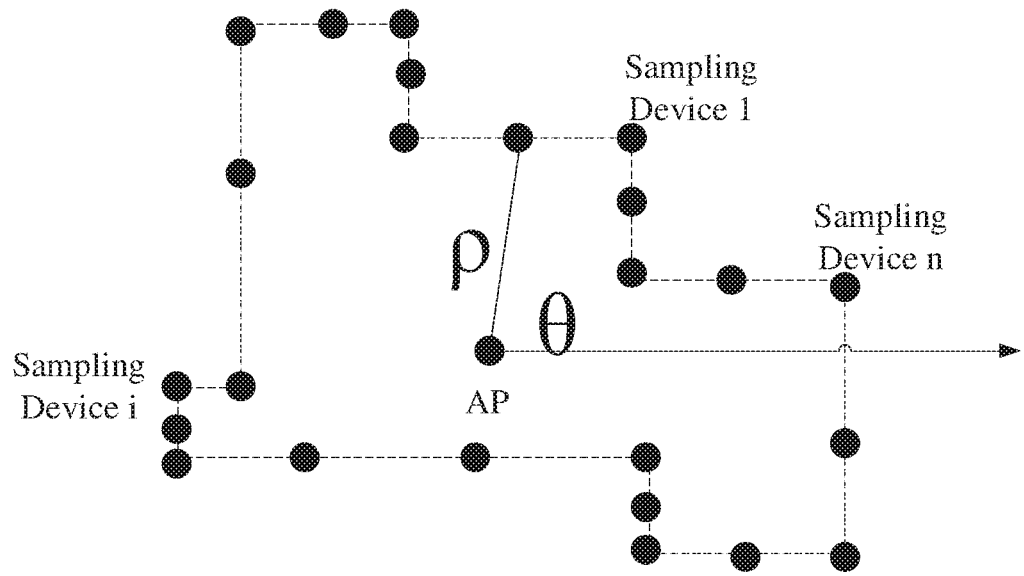
FIG. 9 is a schematic diagram of a password-free range according to an embodiment of the present application.

The shape of the password-free range surrounded by the boundary lines of the password-free range may be any shape, for example, it may be an elliptical password-free area as shown in FIG. 7, a rectangular password-free area as shown in FIG. 8, or an irregular area as shown in FIG. 9. For example, when a user wants to set an inside of a certain shopping mall as a password-free range, the user can set preset boundary lines of the password-free range according to the shape of the area of the shopping mall. In an actual application, Method 2 is more flexible and more universal than Method 1 in applications. However, Method 2 requires more sampling devices to improve the accuracy of the password-free range due to its irregularities. In a specific implementation, the two methods for determining the password-free range can be flexibly used in combination with practical application conditions.

The AP device may use the data shown in Table 1 in Method 1, or the boundary function may save the relationship between the reception strengths and the reception angles in the positioning responses of the sampling devices on the boundary lines of the password-free range. A specific implementation may refer to Method 1 and is not repeated here.

By adopting either Method 1 or Method 2, the boundary function characterizing the relationship between the reception strengths and the reception angles of the broadcast signal in the positioning responses sent by the sampling devices at the boundary of the password-free range can be obtained. When determining whether or not any terminal is located within the password-free range, the AP device may determine whether or not the terminal is located within the password-free range directly according to a functional relationship between the positioning characteristics in the positioning response returned by the terminal and the boundary function, thereby omitting a process of calculating a specific position of the terminal and accelerating a response speed of the AP device.

Figure 10:
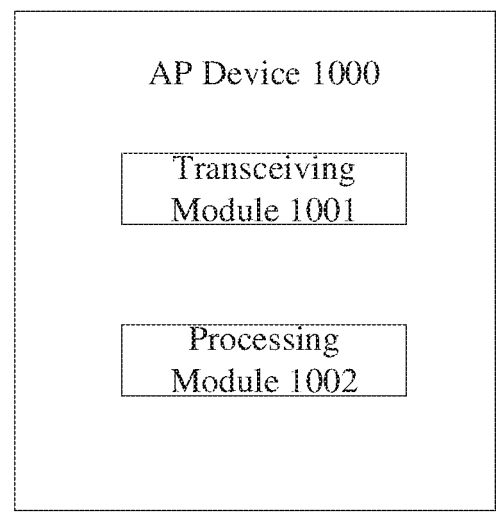
FIG. 10 is a schematic structural diagram of an AP device according to an embodiment of the present application.

Based on the same technical concept, an embodiment of the present application provides an AP device which is an encrypted AP device. FIG. 10 is a schematic structural diagram of an AP device according to an embodiment of the present application, wherein the AP device can implement the terminal verification method according to any of the above embodiments. As shown in FIG. 10, the AP device 1000 comprises: a transceiving module 1001 and a processing module 1002, wherein:

the transceiving module 1001 is configured to receive a connection request sent by a first terminal; wherein the connection request comprises identification information of the first terminal;

the processing module 1002 is configured to query an authorization list according to the identification information of the first terminal; wherein the authorization list includes identification information of terminals located within a preset password-free range; and return an authorization response to the first terminal when the authorization list includes the identification information of the first terminal; wherein the authorization response is used for instructing the first terminal to establish a network connection with the AP device.

Alternatively, the transceiving module 1001 is further configured to:

periodically transmitting a broadcast signal; wherein the broadcast signal is used for instructing the first terminal to determine positioning characteristics of the received broadcast signal and return a positioning response to the AP device; the positioning response includes the identification information of the first terminal and the positioning characteristics; the first terminal is any terminal which receives the broadcast signal;

the processing module 1002 is further configured to receive the positioning response through the transceiving module 1001, and add the identification information of the first terminal into the authorization list when it is determined according to the positioning characteristics in the positioning response that the first terminal is located within the password-free range and the identification information of the first terminal does not exist in the authorization list.

Alternatively, the processing module 1002 is further configured to:

send an authentication response to the first terminal through the transceiving module.

Alternatively, the processing module 1002 is further configured to:

when the authorization list does not include the identification information of the first terminal, confirm that the first terminal fails to be verified; or, send a verification instruction to the first terminal through the transceiving module 1001; wherein the verification instruction is used for instructing the first terminal to return a verification key; and verify the first terminal according to the verification key returned by the first terminal.

Alternatively, the transceiving module 1001 is further configured to:

receive an Internet access signal sent by the first terminal; wherein the Internet access signal is sent to the AP device after the first terminal establishes the network connection with the AP device; wherein the Internet access signal comprises the identification information of the first terminal; and the processing module 1002 is further configured to: after determining that the authorization list includes the identification information of the first terminal, return a reception response to the first terminal through the transceiving module 1001.

Alternatively, the positioning characteristics of the broadcast signal include a reception strength and a reception angle of the broadcast signal.

Alternatively, the password-free range is represented by a boundary function; wherein the boundary function is used for characterizing a relationship between the reception strength and the reception angle of the broadcast signal at a boundary of the password-free range;

the transceiving module 1001 is further configured to:

transmit the broadcast signal; and receive positioning responses returned by a plurality of sampling devices according to the broadcast signal; and the processing module 1002 is further configured to:

determine a positioning response with the reception strength meeting a preset strength among the positioning responses returned by the plurality of sampling devices; and determine the boundary function of the password-free range according to the reception strength and the reception angle in the positioning response with the reception strength meeting the preset strength.

Alternatively, the password-free range is represented by a boundary function; the boundary function is used for characterizing a relationship between the reception strength and the reception angle of the broadcast signal at a boundary of the password-free range;

the transceiving module 1001 is further configured to:

transmit the broadcast signal; and receive positioning responses returned by a plurality of sampling devices according to the broadcast signal; wherein the plurality of sampling devices are located at a preset boundary of the password-free range; and the processing module 1002 is further configured to:

determine the boundary function of the password-free range according to the reception strengths and the reception angles in the positioning responses returned by the plurality of sampling devices.

Alternatively, the processing module 1002 determines whether the terminal is located within the password-free range according to a functional relationship between the positioning characteristics in the positioning response returned by the first terminal and the boundary function.

Figure 11:
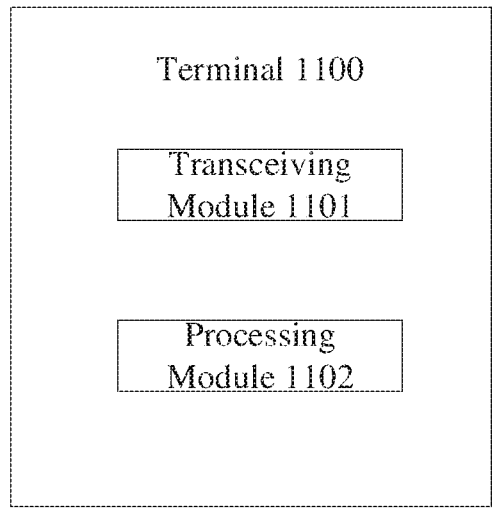
FIG. 11 is a schematic structural diagram of a terminal according to an embodiment of the present application.

Based on the same technical concept, an embodiment of the present application provides a terminal, which is applied to a Wireless Local Area Network (WLAN), wherein the WLAN further comprises an encrypted AP device. FIG. 11 is a schematic structural diagram of a terminal according to an embodiment of the present application, where the terminal can implement the terminal verification method according to any of the above embodiments. As shown in FIG. 11, the terminal 1100 comprises: a transceiving module 1101 and a processing module 1102, wherein:

the transceiving module 1101 is configured to send a connection request a target AP device; wherein the connection request includes identification information of the terminal; and receive an authorization response returned by the target AP device; wherein the authorization response is returned to the terminal when the target AP device determines that an authorization list includes the identification information of the terminal; the authorization list includes identification information of terminals located within a preset password-free range of the AP device; and the processing module 1102 is configured to establish a network connection with the target AP device according to the authorization response.

Alternatively, the processing module 1102 is further configured to:

when the transceiving module 1101 receives broadcast information transmitted by any AP device, determine positioning characteristics of the broadcast information; return a positioning response to the AP device through the transceiving module 1101; wherein the positioning response includes the positioning characteristics and the identification information of the terminal.

Alternatively, the processing module 1102 is further configured to:

when authentication responses sent by a plurality of AP devices are received by the transceiving module at the same time, determine an AP device with the strongest signal strength among a plurality of authentication responses as the target AP device; wherein the authentication response is sent to the terminal after the AP device determines that the terminal is located within the preset password-free range according to the positioning response; and send the connection request to the target AP device through the transceiving module 1101.

Alternatively, the transceiving module 1101 is further configured to:

send an Internet access signal to the target AP device; wherein the Internet access signal comprises the identification information of the terminal; and the processing module 1102 is further configured to:

re-determine a target AP device when a reception response returned by the target AP device is not received after a preset waiting period.

Figure 12:
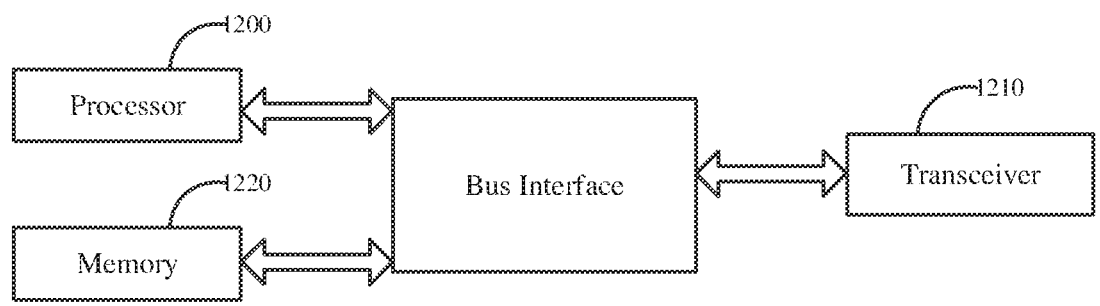
FIG. 12 is a schematic structural diagram of an AP device according to an embodiment of the present application.

Based on the same technical concept, an embodiment of the present application further provides an AP device. FIG. 12 is a schematic structural diagram of an AP device according to an embodiment of the present application. The AP device in FIG. 12 comprises a processor 1200 configured to read a program in a memory 1220 and perform the terminal verification method according to any of the above embodiments.

In FIG. 12, a bus interface may include any number of interconnected buses and bridges, which are linked together by various circuits, in particular, one or more processors represented by the processor 1200 and a memory represented by the memory 1220. The bus interface may also link together various other circuits such as peripherals, voltage regulators, power management circuits, which are well known in the art, and therefore will not be described further herein. The bus interface provides an interface. A transceiver 1210 may be a number of elements, including a transmitter and a receiver, to provide units for communicating with various other apparatuses over a transmission medium.

The processor 1200 is responsible for managing bus interfaces and general processing, and the memory 1220 may store data used by the processor 1200 during performing operations.

Alternatively, the processor 1200 may be a CPU (central processing unit), an ASIC (Application Specific Integrated Circuit), an FPGA (Field-Programmable Gate Array), or a CPLD (Complex Programmable Logic Device).

Figure 13:
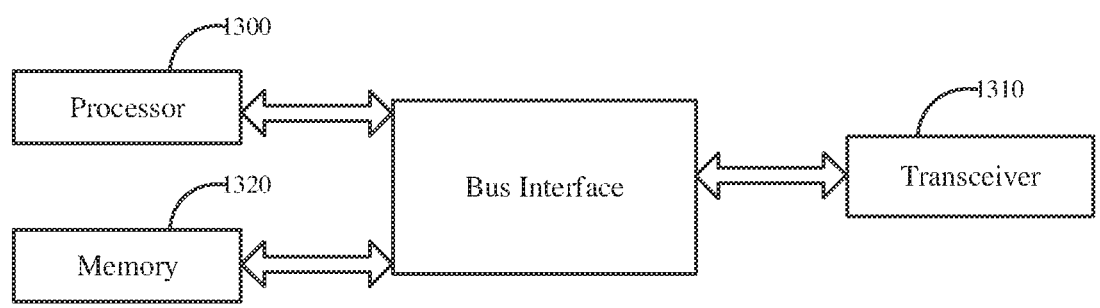
FIG. 13 is a schematic structural diagram of a terminal according to an embodiment of the present application.

Based on the same technical concept, an embodiment of the present application provides a terminal. FIG. 13 is a schematic structural diagram of a terminal according to an embodiment of the present application. The terminal in FIG. 13 comprises a processor 1300 configured to read a program in a memory 1320, and perform, according to the obtained program, the terminal verification method according to any of the above embodiments through the transceiver 1310.

Based on the same technical concept, an embodiment of the present application provides a WLAN system, comprising an AP device of any of the above embodiments, and/or a terminal of any of the above embodiments.

Based on the same technical concept, an embodiment of the present application provides a computer program product comprising a computer program stored on a non-transient computer-readable storage medium, the computer program comprising computer executable instructions that, when executed by a computer, cause the computer to perform the terminal verification method of any of the above embodiments.

While preferred embodiments of the present application have been described, additional variations and modifications in those embodiments may occur to those skilled in the art once they learn of the basic inventive concepts. Therefore, it is intended that the appended claims be interpreted as including the preferred embodiment and all variations and modifications that fall within the scope of the present application.

It will be apparent to those skilled in the art that various variations and modifications may be made in the present application without departing from the spirit and scope of the application. Thus, if such modifications and variations of the present application fall within the scope of the claims of the present application and their equivalents, the present application is also intended to include such modifications and variations.

What is claimed is:

1. A terminal verification method, applied to an Access Point (AP) device in a Wireless Local Area Network (WLAN), wherein the AP device is an encrypted AP device, the method comprising: receiving a connection request sent by a first terminal; wherein the connection request comprises identification information of the first terminal;

querying an authorization list according to the identification information of the first terminal; wherein the authorization list includes identification information of terminals located within a preset password-free range; and returning an authorization response to the first terminal when the authorization list includes the identification information of the first terminal; wherein the authorization response is used for instructing the first terminal to establish a network connection with the AP device, wherein the method further comprises:

receiving an Internet access signal sent by the first terminal; wherein the Internet access signal is sent to the AP device after the first terminal establishes the network connection with the AP device; wherein the Internet access signal comprises the identification information of the first terminal; and after receiving the Internet access signal determining that the authorization list includes the identification information of the first terminal, and returning a reception response to the first terminal.

2. The method according to claim 1, wherein the method further comprises:
- periodically transmitting a broadcast signal; wherein the broadcast signal is used for instructing the first terminal to determine positioning characteristics of the received broadcast signal and return a positioning response to the AP device; the positioning response includes the identification information of the first terminal and the positioning characteristics; the first terminal is any terminal which receives the broadcast signal; and
- receiving the positioning response, and adding the identification information of the first terminal into the authorization list when it is determined according to the positioning characteristics in the positioning response that the first terminal is located within the password-free range and the identification information of the first terminal does not exist in the authorization list.

3. The method according to claim 2, wherein, after adding the identification information of the first terminal into the authorization list, the method further comprises:
- sending an authentication response to the first terminal.

4. The method according to claim 2, wherein the positioning characteristics of the broadcast signal include a reception strength and a reception angle of the broadcast signal.

5. The method according to claim 4, wherein the password-free range is represented by a boundary function; wherein the boundary function is used for characterizing a relationship between the reception strength and the reception angle of the broadcast signal at a boundary of the password-free range;
the method further comprises:
- transmitting the broadcast signal;
- receiving positioning responses returned by a plurality of sampling devices according to the broadcast signal;
- determining a positioning response with the reception strength meeting a preset strength among the positioning responses returned by the plurality of sampling devices; and
- determining the boundary function of the password-free range according to the reception strength and the reception angle in the positioning response with the reception strength meeting the preset strength.

6. The method according to claim 5, wherein the AP device determines whether the terminal is located within the password-free range according to a functional relationship between the positioning characteristics in the positioning response returned by the first terminal and the boundary function.

7. The method according to claim 4, wherein the password-free range is represented by a boundary function; the boundary function is used for characterizing a relationship between the reception strength and the reception angle of the broadcast signal at a boundary of the password-free range;
the method further comprises:
- transmitting the broadcast signal;
- receiving positioning responses returned by a plurality of sampling devices according to the broadcast signal; wherein the plurality of sampling devices are located at a preset boundary of the password-free range; and
- determining the boundary function of the password-free range according to the reception strengths and the reception angles in the positioning responses returned by the plurality of sampling devices.

8. The method according to claim 7, wherein the AP device determines whether the terminal is located within the password-free range according to a functional relationship between the positioning characteristics in the positioning response returned by the first terminal and the boundary function.

9. The method according to claim 1, wherein the method further comprises:
- when the authorization list does not include the identification information of the first terminal, confirming that the first terminal fails to be verified;
- or, sending a verification instruction to the first terminal; wherein the verification instruction is used for instructing the first terminal to return a verification key; and verifying the first terminal according to the verification key returned by the first terminal.

10. A terminal verification method, applied to a terminal in a Wireless Local Area Network (WLAN), wherein the WLAN further includes an encrypted Access Point (AP) device, the method comprising:
- sending a connection request to a target AP device; wherein the connection request includes identification information of the terminal;
- receiving an authorization response returned by the target AP device; wherein the authorization response is returned to the terminal when the target AP device determines that an authorization list includes the identification information of the terminal; the authorization list includes identification information of terminals located within a preset password-free range of the AP device; and
- establishing a network connection with the target AP device according to the authorization response,
the method further comprises:
- when receiving broadcast information transmitted by any AP device, determining positioning characteristics of the broadcast information; and
- returning a positioning response to the AP device; wherein the positioning response includes the positioning characteristics and the identification information of the terminal,
wherein the method further comprises:
- when authentication responses sent by a plurality of AP devices are received at the same time, determining an AP device with the strongest signal strength among a plurality of authentication responses as the target AP device; wherein the authentication response is sent to the terminal after the AP device determines that the terminal is located within the preset password-free range according to the positioning response; and
- sending the connection request to the target AP device.

11. The method according to claim 10, wherein, after establishing a network connection with the target AP device according to the authorization response, the method further comprises:
- sending an Internet access signal to the target AP device; wherein the Internet access signal comprises the identification information of the terminal; and
- re-determining a target AP device when a reception response returned by the target AP device is not received after a preset waiting period.

12. A terminal, applied to a Wireless Local Area Network (WLAN), where the WLAN further includes an encrypted Access Point (AP) device, the terminal comprising:
- a transceiving module and a processing module; wherein the transceiving module is configured to send a connection request to a target AP device; wherein the connection request includes identification information of the terminal; and receive an authorization response returned by the target AP device; wherein the authorization response is returned to the terminal when the target AP device determines that an authorization list includes the identification information of the terminal; the authorization list includes identification information of terminals located within a preset password-free range of the AP device; and the processing module is configured to establish a network connection with the target AP device according to the authorization response, wherein the processing module is further configured to:

when the transceiving module receives broadcast information transmitted by any AP device, determine positioning characteristics of the broadcast information; and return a positioning response to the AP device through the transceiving module; wherein the positioning response includes the positioning characteristics and the identification information of the terminal, wherein the processing module is further configured to:

when authentication responses sent by a plurality of AP devices are received by the transceiving module at the same time, determine an AP device with the strongest signal strength among a plurality of authentication responses as the target AP device; wherein the authentication response is sent to the terminal after the AP device determines that the terminal is located within the preset password-free range according to the positioning response; and send the connection request to the target AP device through the transceiving module.

13. The terminal according to claim 12, wherein the transceiving module is further configured to:

send an Internet access signal to the target AP device; wherein the internet access signal comprises the identification information of the terminal; and the processing module is further configured to:

re-determine a target AP device when a reception response returned by the target AP device is not received after a preset waiting period.

\* \* \* \* \*